United States Patent [19]
Schneider et al.

[11] Patent Number: 5,961,417
[45] Date of Patent: Oct. 5, 1999

[54] CONTINUOUSLY ADJUSTABLE TRANSMISSION ARRANGEMENT

[75] Inventors: Arthur Schneider, Braunschweig; Lars Hofmann, Altenburg, both of Germany

[73] Assignee: Volkswagen AG, Wolfsburg, Germany

[21] Appl. No.: 08/951,860

[22] Filed: Oct. 16, 1997

[30] Foreign Application Priority Data

Oct. 22, 1996 [DE] Germany ............... 196 43 437
Nov. 27, 1996 [DE] Germany ............... 196 49 142

[51] Int. Cl.⁶ .................................. F16H 15/16
[52] U.S. Cl. ............................ 476/53; 475/214
[58] Field of Search ............ 476/52, 53; 475/210, 475/214

[56] References Cited

U.S. PATENT DOCUMENTS

Re. 31,361  8/1983  Smirl ................. 475/210 X
2,686,432  8/1954  Bergmann ............... 74/325
3,633,430  1/1972  Bentley ................ 74/690

FOREIGN PATENT DOCUMENTS 0305110  3/1989  European Pat. Off. .
1200631  9/1965  Germany .
4434020  4/1995  Germany .
431088   2/1948  Italy ................... 476/53

Primary Examiner—Allan D. Herrmann
Attorney, Agent, or Firm—Baker & Botts, L.L.P.

[57] ABSTRACT

A continuously adjustable transmission has two sets of cone pulleys disposed concentrically with respect to each other on a transmission input shaft. Between the two sets of cone pulleys a rigid ring acts as a torque transmitting member for transmitting torque from one set of cone pulleys to the other. This arrangement provides a compact and lightweight transmission producing the best transmission efficiency levels, especially at high and medium gear ratios.

30 Claims, 13 Drawing Sheets

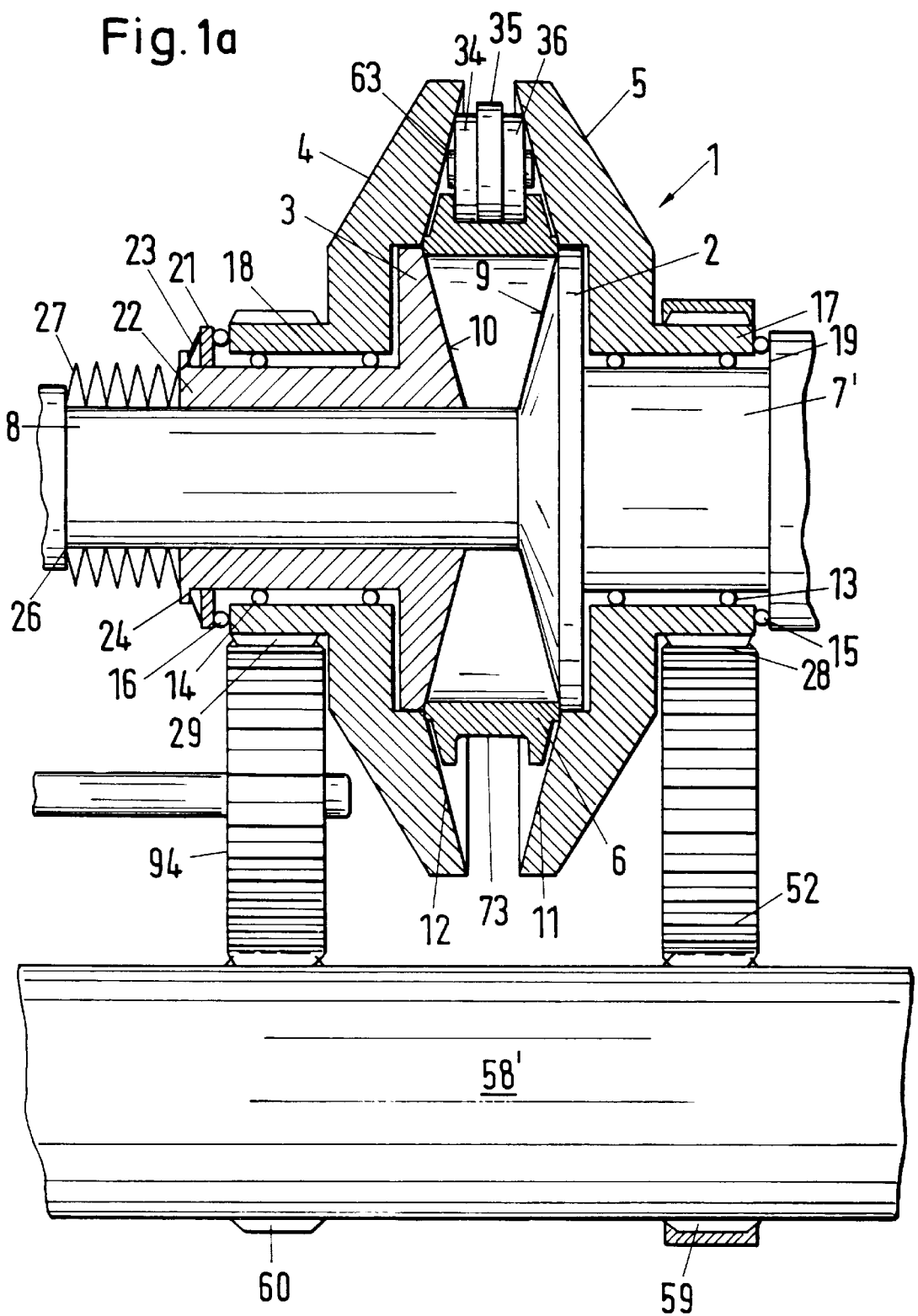

i = 5

CONTINUOUSLY ADJUSTABLE TRANSMISSION ARRANGEMENT

BACKGROUND OF THE INVENTION

This invention relates to a continuously adjustable transmission in which a torque transmission member engages two pairs of cone-shaped pulleys.

German Offenlegungsschrift No. 44 34 020 discloses two pairs of adjust able conical pulleys connected by a torque transmission belt to permit continuous adjustment of the gear ratio. Further transmission arrangements in which the transmission gear ratio can be altered in a continuous manner arc disclosed in "Taschenbuch für den Maschinenbau"(Pocket Book of Mechanical Engineering), Dubbel, 14th edition, page 447, picture 4.

One shortcoming of such customary cone-pulley transmissions is, for example, that these transmissions have their best overall efficiency at medium gear ratios, and have reduced efficiency are at other gear ratios. Moreover, in view of the desire for light motor vehicles having low fuel consumption, a requirement exists for a particularly light and compact automatic transmissions.

SUMMARY OF THE INVENTION

Accordingly, it is an object of the present invention to provide a continuously adjustable transmission which overcome disadvantages of the prior art.

Another object of the invention is to provide continuously adjustable transmission having a good transmission efficiency, especially at high gear ratios.

These and other objects of the invention are attained by providing a transmission having two pairs of cone pulleys joined by a torque-transmitting member in which the two pairs of cone pulleys are disposed concentrically with respect to each other. Compared to the previously known automatic transmissions, this transmission requires significantly fewer components, enabling it to be manufactured cheaply and requires minimum space in the vehicle.

The concentric arrangement of the two pairs of cone pulleys allows the torque transmitting member to have a corresponding outer geometry which permits it to be disposed directly between the two pairs of cone pulleys. The pairs of cone pulleys can have outwardly opening or closing conical surfaces.

As a further characteristic of this transmission arrangement, the two sets of cone pulleys are both located on either the transmission input shaft or the transmission output shaft, and the other shaft can be driven by outer teeth on the outer cone pulleys through gearwheels or by a flexible loop such as a V-belt or a toothed belt.

In this concentric construction there are inner and outer cone pulley pairs and one of the cone pulleys of the outer cone pulley pair is preferably rotatably supported in an axially fixed manner on the drive shaft while the other outer cone pulley is rotatably supported in a reduced-diameter region of the drive shaft. In addition, to compensate for production tolerance variations the latter outer cone pulley is also disposed so that it is axially displaceable and is mounted rotatably on an axial extension of an inner cone pulley which is likewise disposed in an axially displaceable manner on the drive shaft section of reduced diameter. It is particularly advantageous if the axially displaceable inner cone pulley is mounted onto the drive shaft section of reduced diameter and the outer cone pulleys are rotatably supported in axially fixed relation on the drive shaft and on the axially displaceable inner cone pulley respectively.

Thrust bearings are preferably disposed between the outer cone pulleys and a shaft collar on the drive shaft and an abutment on an extension of the axially displaceable inner cone pulley.

To generate contact pressure of the outer cone pulleys against a torque transmitting member coupled to the cone pulleys, the thrust bearing of the axially movable outer cone pulley engages a ring disposed on the axial continuation of the axially movable inner cone pulley and forming an abutment thereon and that ring receives pressure on its side facing away from the thrust bearing from a pressure-applying arrangement which acts against the thrust bearing and hence against the axially displaceable outer cone pulley. This pressure-applying arrangement can be a spring element or a pressure medium-driven piston and cylinder arrangement disposed between the ring and a shaft collar on the extension of the axially displaceable inner cone pulley.

Adjustment of the axially displaceable inner cone pulley is effected by adjusting the radial position of the torque transmitting member. To generate a contact pressure between the cone pulleys and the torque transmitting member, a pressure-medium-driven actuating mechanism may be provided which applies a pressure which is controlled in accordance with a desired gear ratio and/or input torque. In the simplest case, a spring disposed between the end face of the cone pulley extension and a shaft collar on the drive shaft suffices as a suitable pressure-applying arrangement.

To transmit power from the inner cone pulley set to the outer cone pulley set, the torque-transmitting member is a loop-shaped member which is preferably a rigid ring. In one embodiment, the rigid ring can be a coated metal component, in which a metallic core is covered by a friction material. In other variants, the surfaces of the cone pulleys which engage the rigid ring arc also or solely coated with a friction material.

The rigid ring has an outer contour which is suitable for transmitting the torque applied to it by the inclined surfaces of the inner cone pulley set with its cone pulley surfaces which open radially outwardly and for applying the torque to the inclined surfaces of the cone pulleys of the outer cone pulley set, which close radially outwardly. To this end, the portions of the sides of the rigid ring are essentially V-shaped in configuration. Also, the radially outer circumference of the torque transmitting member has a cross-sectional geometry which has a U-shaped, a V-shaped, a semicircular or an elliptical recess, or exhibits a rectangular indentation so as to be suitable for receiving an adjusting device which exerts an adjustment force upon the torque transmitting member.

In one embodiment the torque transmitting member has a roughly double-T cross-sectional geometry. The radially inner arm of the T is disposed in the region of the inner and outer conical surfaces of the two cone pulley pairs and is connected to the radially outer arm of the T by a ring section which extends radially outside the outer cone pulleys. In this case, the radially outer arm of the T can be provided with a recess for the reception of pressure applying elements.

The angles of inclination of the surfaces of the V-shaped faces of the torque transmitting member preferably correspond to the angles of inclination of the outer and inner cone pulley surfaces with respect to a surface extending perpendicular to the shaft on which the cone pulley sets are mounted.

For the adjustment of the position of the torque transmitting member, and hence for the alteration of the gear ratio of the continuously adjustable transmission, an adjusting arrangement is provided which includes at least one pressure element extending into a recess in the outer surface of the torque transmitting member. This adjusting device is mounted on the transmission housing and is disposed so that the pressure element can be moved essentially radially to the longitudinal axis of the transmission shaft on which the cone sets are supported.

In one embodiment, the adjusting device can be an actuating rod of a piston and cylinder arrangement which supports at its free end at least one rotatably mounted pressure roller or a slide block in engagement with the outer surface of the torque transmitting member.

In another embodiment, the control member of the adjusting device is an arc-shaped metal plate, supporting at least one pressure exerting element, preferably rotatably mounted pressure rollers, facing the outer surface of the torque transmitting member. The pressure rollers are received in the recess of the torque transmitting member and thus exert a radial adjustment force on that member to control the setting of the desired gear ratio. This arc-shaped control member is pivotally supported at one end, preferably on the transmission housing, and the other end is coupled an actuating device which is also mounted on the transmission housing.

The adjusting device may be a control lever which is pivotally mounted on the transmission housing and supports at least one rotatably supported pressure roller or a slide block at an end adjacent to the cone pulleys. At the other end of the control lever extending away from the cone pulleys the control lever is connected to a pressure-medium-operated control arrangement.

According to one embodiment the torque transmitting member is a rigid ring having a cross-sectional geometry with an outer contour exhibiting at least four radii $r_1$ to $r_4$ which engage the cone pulley surfaces, the radii $r_1$ and $r_2$, respectively, being larger than the radii $r_3$ and $r_4$. This permits the surface pressure between the torque transmission member and the cone pulley surfaces to be set to a minimum torque-transmitting value with respect to the frictionally engaging materials. In a preferred embodiment the regions of the torque transmission member having the smaller outer contour radii $r_1$ and $r_2$ form the friction surfaces for the inner cone pulleys and the regions having the larger outer contour radii $r_3$ and $r_4$ form the friction surfaces for the outer cone pulleys of the transmission. In addition, the outer contour of the torque transmission member may have further outer contour radii $r_5$, and $r_6$, which are located on the outer contour between the radii $r_1$ and $r_3$ and the radii $r_2$ and $r_4$. Preferably, the outer contour radii $r_5$ and $r_6$ are in this case larger than the radii $r_3$ and $r_4$.

BRIEF DESCRIPTION OF THE DRAWINGS

Further objects and advantages of the invention will be apparent from a reading of the following description in conjunction with the accompanying drawings, in which:

FIG. 1a is a schematic sectional view showing another representative embodiment of a continuously adjustable transmission in accordance with the invention:

DESCRIPTION OF PREFERRED EMBODIMENTS

Figure 1:
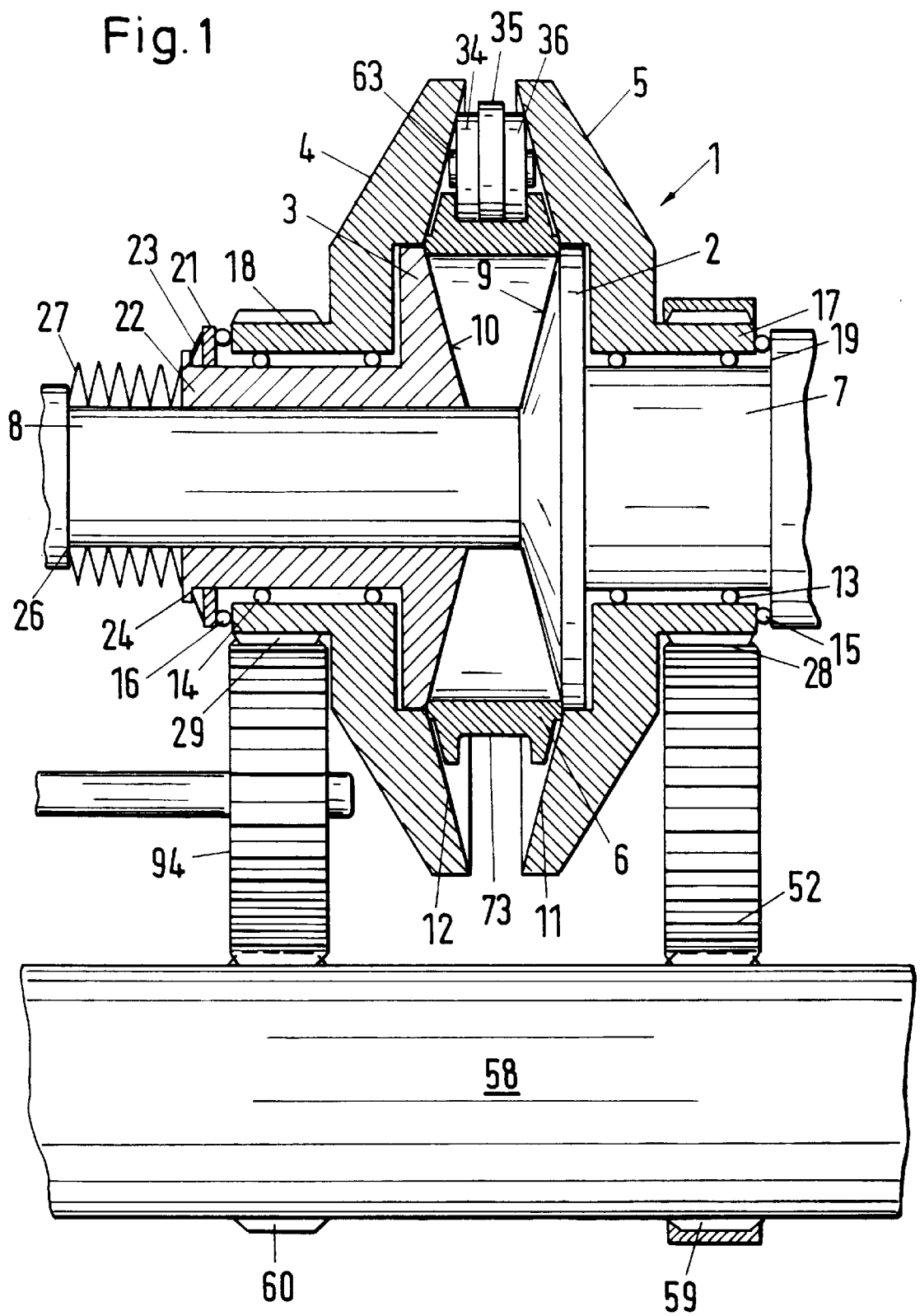
FIG. 1 is a schematic sectional view showing a representative embodiment of a continuously adjustable transmission in accordance with the invention.

In the typical embodiment of the invention shown in FIG. 1, a continuously adjustable transmission includes two sets of cone pulleys 2 and 3 and 4 and 5, respectively, disposed concentrically with respect to each other, both sets of pulleys being disposed on a transmission input shaft having two sections 7 and 8 of different diameter. The inner cone pulley set includes a cone pulley 2 fixedly connected to both the sections 7 and 8 of the input shaft and a cone pulley 3 rotatably fixed but axially displaceable on the smaller diameter section 8 of the transmission input shaft. The cone pulleys 2 and 3 of this inner cone pulley set have conical surfaces 9 and 10, respectively, which open radially outwardly.

The inner cone pulley set is surrounded by the outer cone pulley set consisting of the cone pulleys 4 and 5 which have corresponding conical surfaces 11 and 12 which taper inwardly in the radially outward direction.

One cone pulley 5 of the outer cone pulley set is rotatably mounted on the larger diameter section 7 of the input shaft and the other cone pulley 4 of that set is rotatably supported on an axial extension 22 of the inner cone pulley 3 by roller bearings 13 and 14 and by thrust bearings 15 and 16. The thrust bearing 15 is supported against a shaft collar 19 of the transmission input shaft section 7 in this illustrated embodiment of the invention and thus does not permit axial motion of the outer cone pulley 5 while the outer cone pulley 4 is supported axially against a ring 21 mounted on the inner cone pulley extension 22 and the ring 21 is supported by a spring element 23 against an end collar 24 of the extension 22. This spring element 23 serves essentially to compensate for axial variations resulting from production tolerances.

To apply contact pressure upon the inner, axially displaceable, cone pulley 3 in the embodiment in FIG. 1, a pressure-applying arrangement in the form of a spring 27 is provided on the smaller diameter section 8 of the transmission input shaft and extends between a shaft collar 26 on the transmission input shaft and the facing end 24 of the extension 22 of the inner cone pulley 3.

Figure 6:
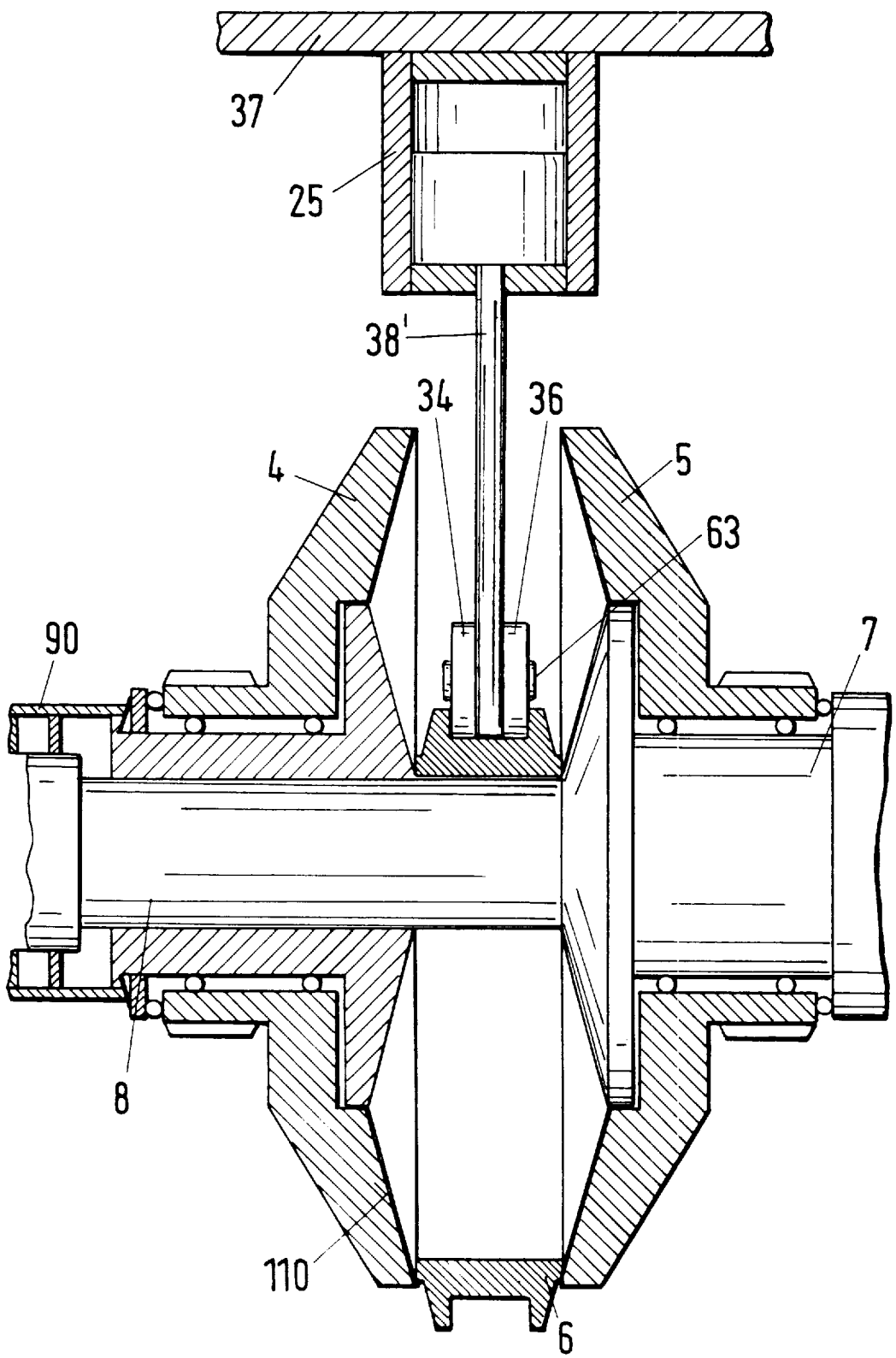
FIG. 6 is a view similar to FIG. 3 showing a piston rod actuating device.

Instead of the spring shown in FIG. 1, a pressure medium operated control device such as, for instance, piston and cylinder arrangement 90 shown in FIG. 6, can also be used to generate contact pressure between the cone pulleys and the torque transmitting member.

A torque transmitting member in the form of a rigid ring 6 is supported between the coaxially disposed inner and outer cone pulleys. The rigid ring 6 has a cross-sectional geometry on its sides 32 and 33 (see FIG. 9) which is essentially V-shaped. The arms of the V extend at such an angle to each other that, in all speed ratios of the transmission, they engage the conical surfaces 9 and 10 and 11 and 12 of the inner and outer cone pulleys 2 and 3 and 4 and 5, respectively, for torque transmission.

In the particular embodiment shown in FIG. 1, the rigid ring 6 is shaped with is a recess 73 on its radial outer circumference in which at least one pressure applying element 34 of an adjusting device 35 is received. By controlling the force applied by the adjusting device upon the rigid ring, the rigid ring can be moved radially between inner and outer cone pulleys so as to change the resulting gear ratio in a continuous manner.

To transmit the drive power from the outer cone pulleys 4 and 5 to a transmission output shaft 58, peripheral teeth 28 and 29 are formed on axial extensions 17 and 18 of the outer cone pulleys 4 and 5, respectively. Either toothed belts or chains 52 which engage these teeth, and which also engage teeth 59 and 60 on the transmission output shaft 58, transmit output power from the outer cone pulleys to the output shaft. As an alternative, intermediate gears 94 which mesh with the outer teeth 28 and 29 of the outer cone pulley 4 and with the teeth 59 and 60 on the transmission output shaft 58 can be provided.

FIG. 1a illustrates a transmission which is identical to that of FIG. 1 except that the output shaft 58 of FIG. 1 is replaced by an input shaft 58' and the input shaft 7 of FIG. 1 is replaced by an output shaft 7'.

Figure 2:
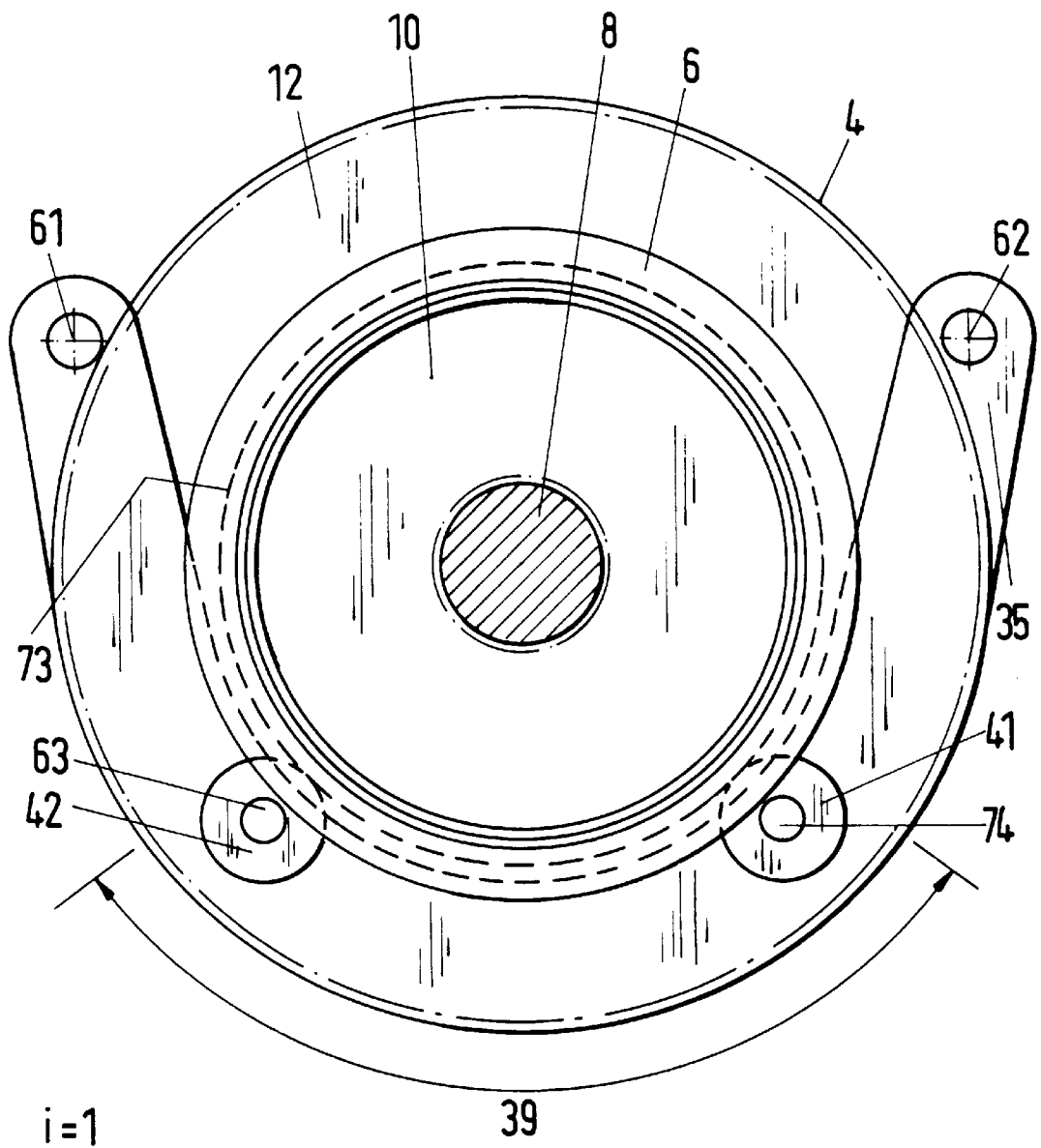
FIG. 2 is a cross-sectional view of a transmission similar to that of FIG. 1 taken through the cone-shaped pulleys and showing a gear ratio adjusting device.

The transmission according to FIG. 1 is illustrated in a condition in which the rigid ring 6 is unstressed radially, so that the transmission is operating in a gear ratio I=1. FIG. 2 shows a cross section through a transmission similar to that of FIG. 1 in the region of the adjusting device 35 looking toward the conical surfaces 10 and 12 of the cone pulleys 3 and 4. In this view also the transmission is in a setting equivalent to a gear ratio I=1.

In this embodiment, the adjusting device for the continuously variable transmission includes a control member 35 having an arc-shaped section 39 in which two pressure members engaging the rigid ring 6 are mounted. The pressure members are rotatably mounted on axles 63 and 74 and are in this case shown as pressure rollers 41 and 42. These pressure rollers are received in the recess 73 in the rigid ring 6 and, being laterally guided in this way, are able to exert upon the rigid ring 6 a radial control force which is necessary for the adjustment of the gear ratio. The control member 35, which may be, for example, a metal plate component, is mounted at an attachment point 61 so that it is fixed to the transmission housing but can be pivoted about the point 61. A second attachment point 62 is connected to an actuating device which is not shown in FIG. 2.

Figure 3:
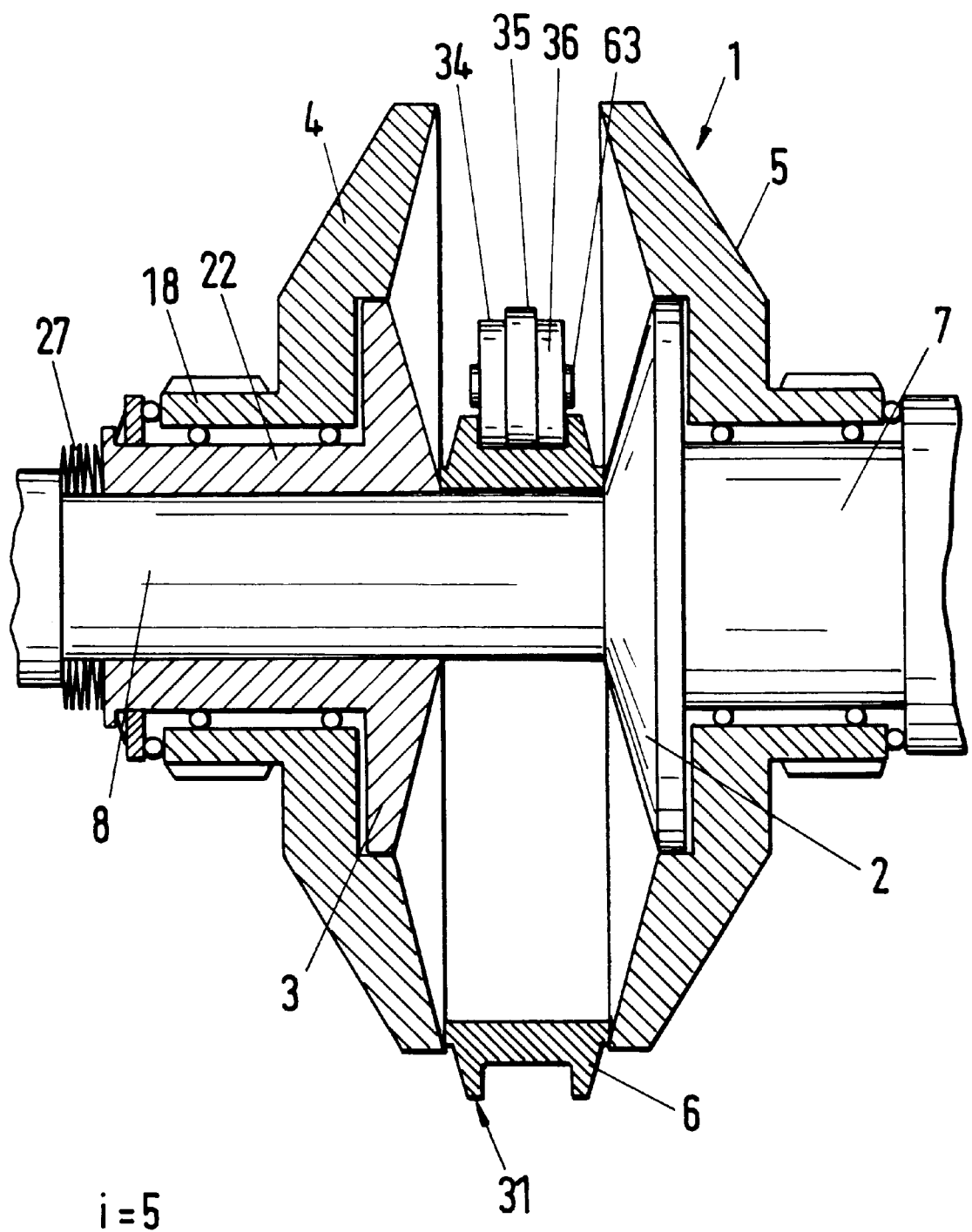
FIG. 3 is a view of the transmission as shown in FIG. 1 set to a gear ratio of I=5.
Figure 4:
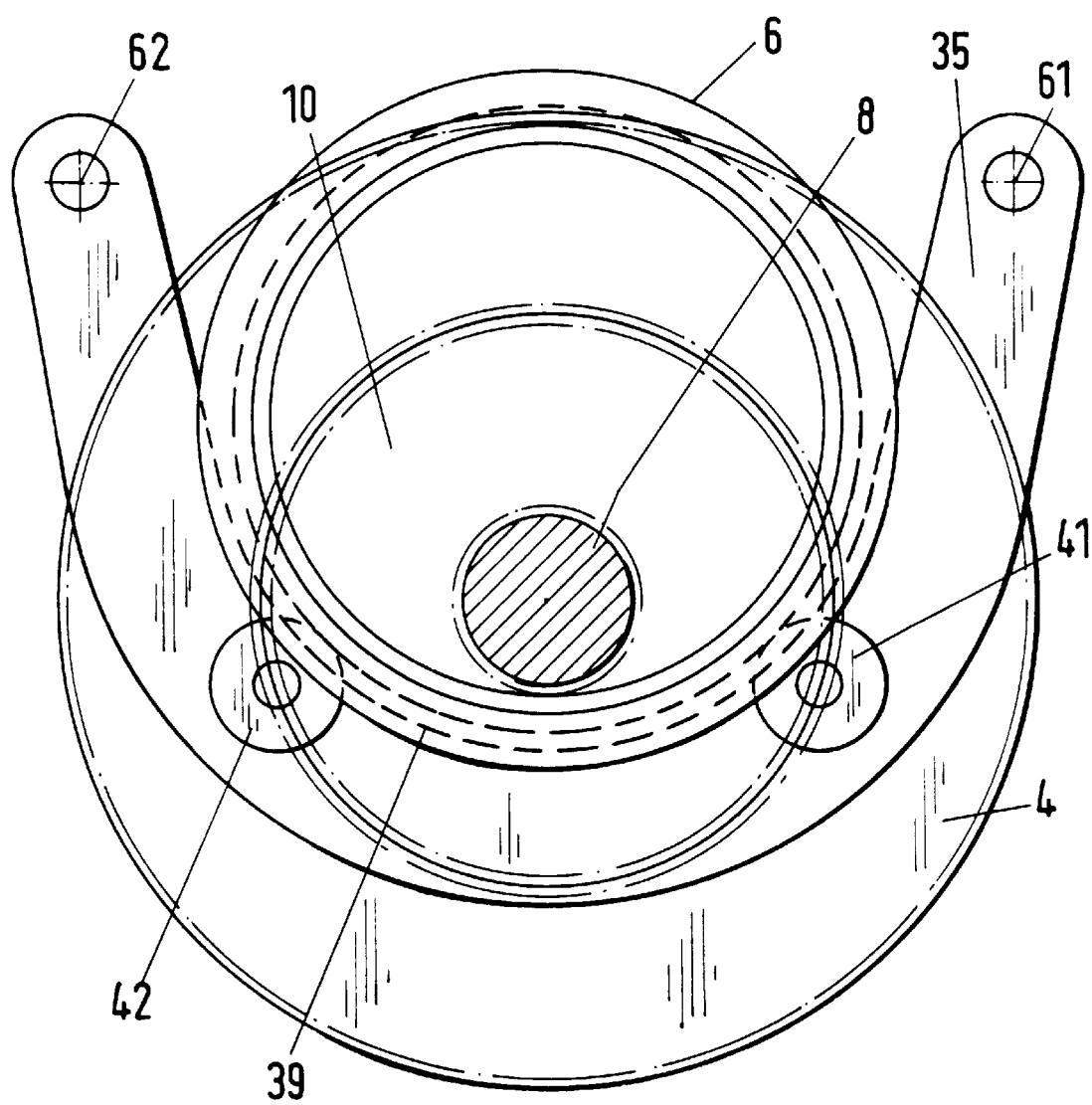
FIG. 4 is a view of the transmission as shown in FIG. 2 set to a gear ratio of I=5.

FIG. 3 shows the transmission 1 in the position providing the greatest gear ratio which in the dimensions shown here amounts to I=5. In this condition the rigid ring 6 is located adjacent to the drive axle 8 and adjacent to the outer periphery of the outer cone pulleys 4 and 5. This condition is likewise portrayed in the cross-sectional representation shown in FIG. 4.

Figure 5:
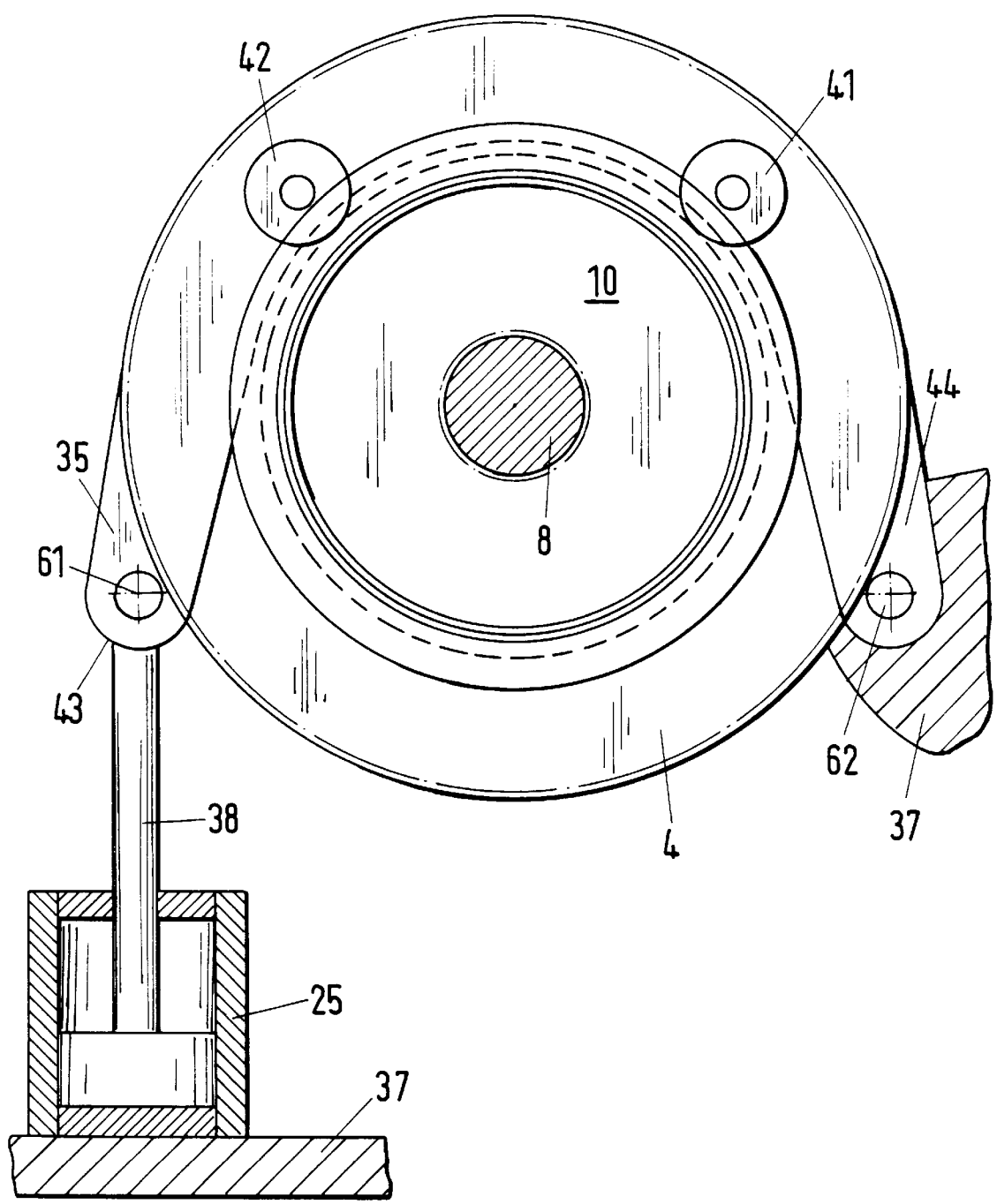
FIG. 5 is a cross-sectional view showing an arc-shaped adjusting device similar to FIG. 2 but including an actuating arrangement.

FIG. 5 shows the fastening of the attachment point 62 at the end 44 of the control member 35 to the transmission housing 37 and of the point 61 at the end 43 of the control member to a piston rod 38 of a pressure-medium-operated piston and cylinder arrangement 25 which is attached to the transmission housing. Instead of the piston and cylinder arrangement shown in FIG. 5, electrically driven stepping motor systems can also be used.

Another adjusting device for setting the gear ratio of the transmission is represented in FIG. 6. In this embodiment also, a piston and cylinder arrangement 25 attached to the transmission housing 37 acts upon the rigid ring 6. Unlike the embodiment shown in FIG. 5, however, there is no arc-shaped control member in this case, but an essentially bar-shaped control lever 38, which, as an extended piston rod, supports, at its end remote from the cylinder of the piston-cylinder arrangement 25, two running rollers 34 and 36 on a rotary axle 63 which are received in a recess 73 of the rigid ring 6.

Figure 7:
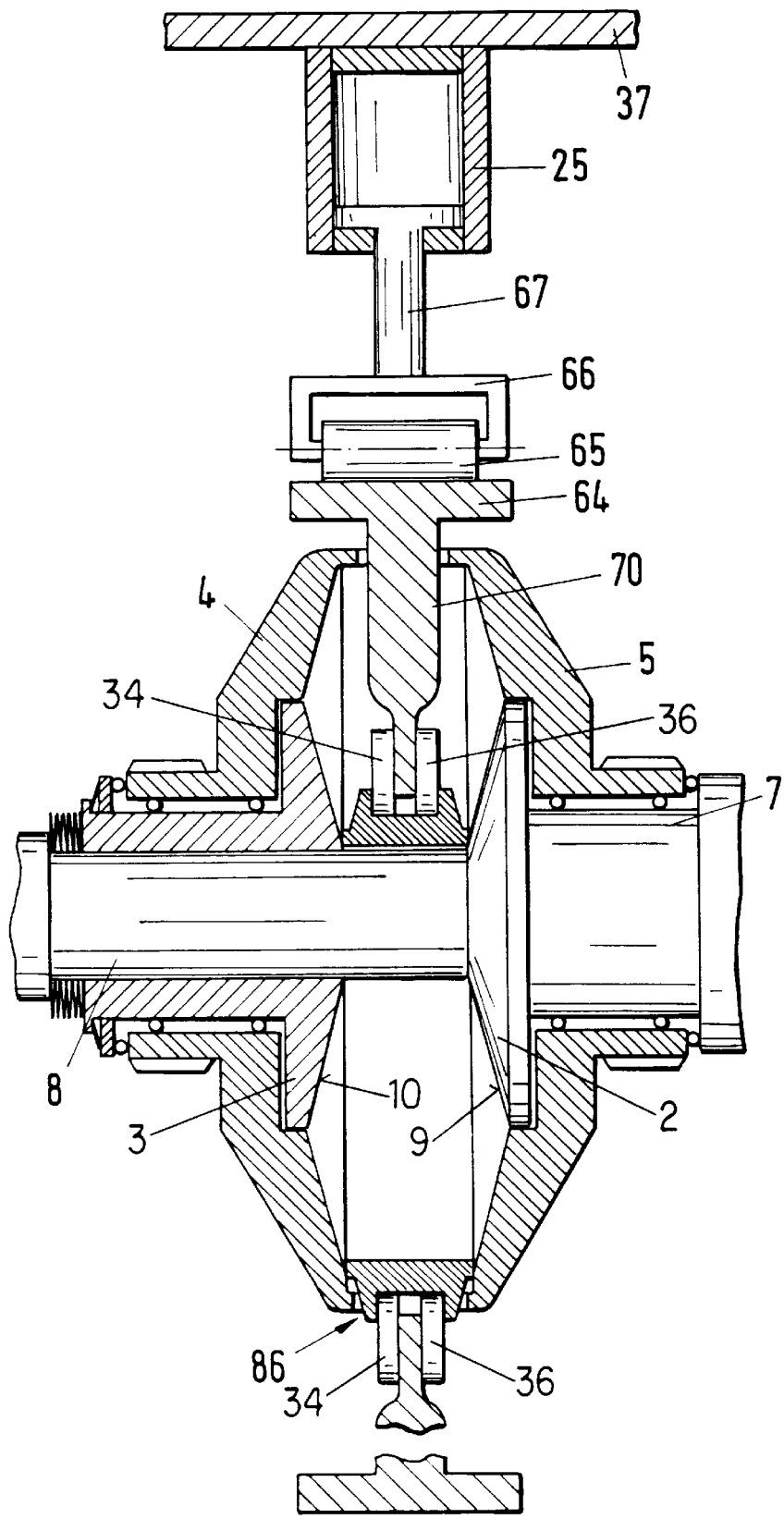
FIG. 7 is a view similar to FIG. 3 showing a double-T-shaped torque transmitting member and an actuating device engaging the torque-transmitting member outside the cone pulleys.

In a further embodiment of the invention shown in FIG. 7, a rigid ring 86 is surrounded by a further ring 64, which has a T-shaped cross section and extends through the opening between the outer cone pulleys 4 and 5. The inner end of the T-shaped ring closer to the drive shaft sections 7 and 8 is provided, in a manner already described, with rollers which are received in a recess in the outer surface of the rigid ring 86. On the outer circumference of the T-shaped ring 64, one or more pressure elements 65 exert a radial contact pressure for adjustment of the gear ratio. The pressure roller 65 is in this case connected through a bearing device 66 to the piston rod 67 of the piston and cylinder arrangement 25 which is affixed to the transmission housing 37. An advantage of this embodiment is that the adjusting members 65–67 for the rigid ring 86 do not need to extend into the region between the outer cone pulleys 4 and 5.

Figure 8:
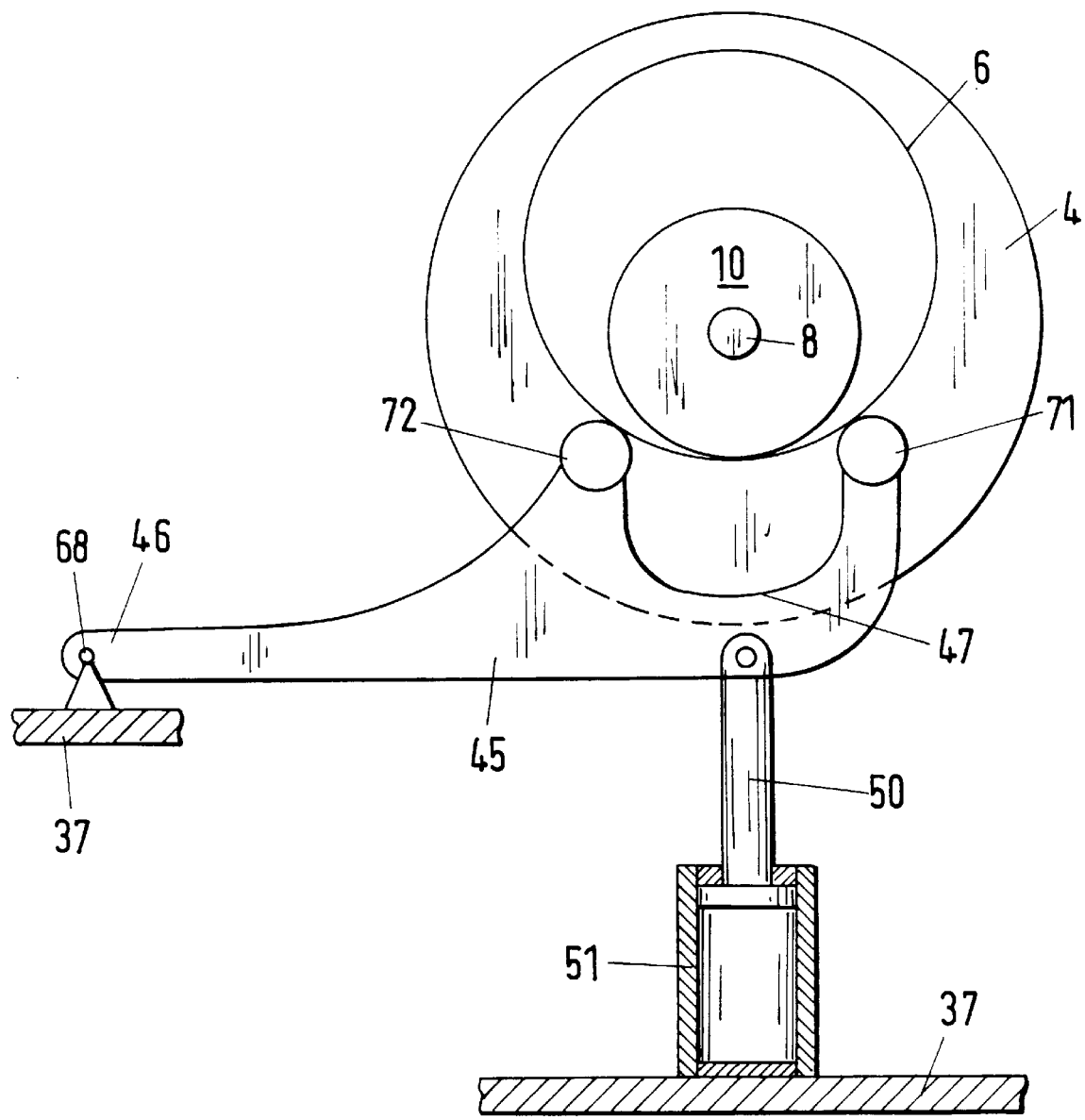
FIG. 8 is a schematic side view showing a control lever actuating device for the torque-transmitting member of the transmission shown in FIG. 1.
Figure 8A:
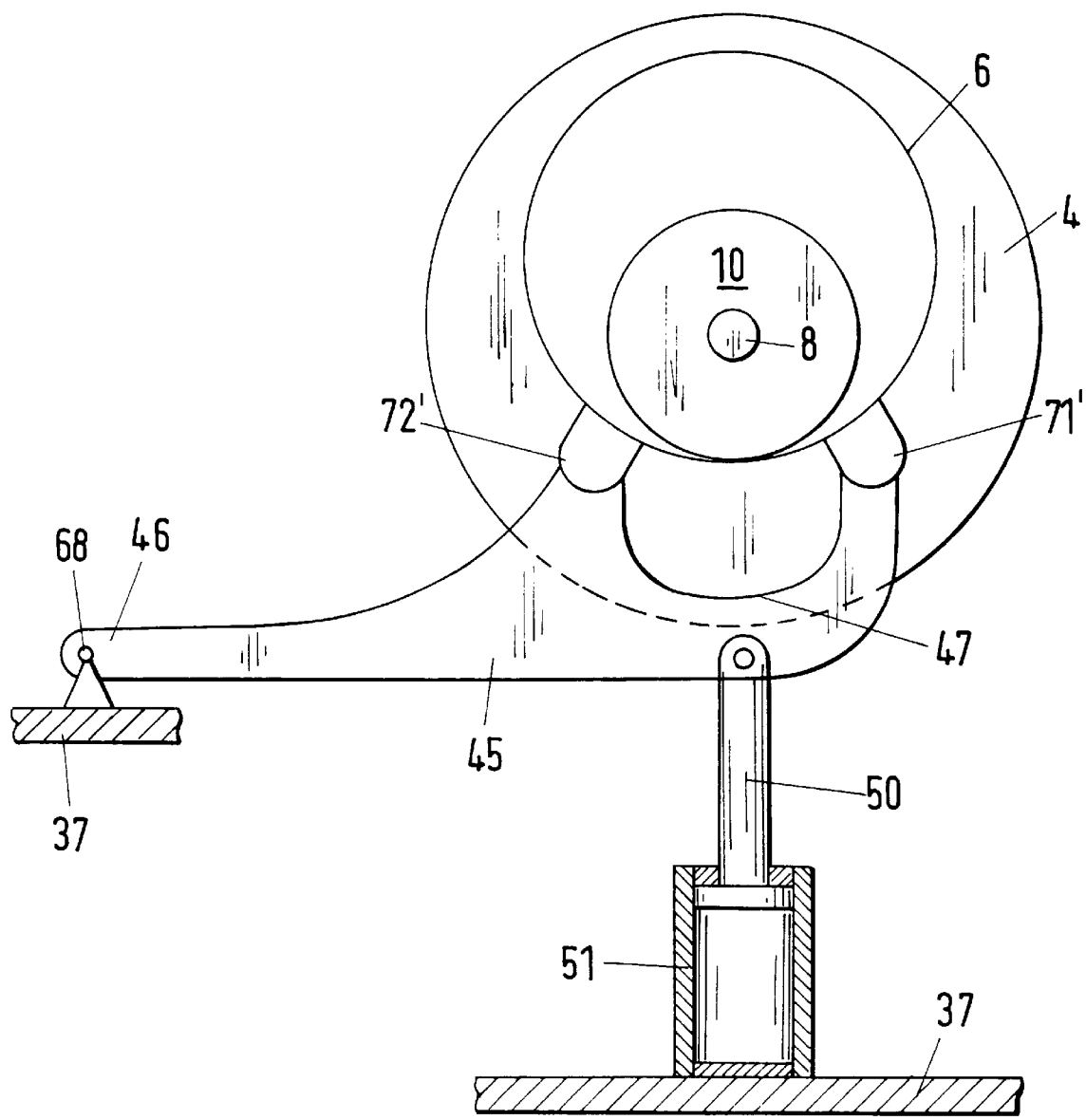
FIG. 8a is a schematic side view showing another control lever arrangement similar to that of FIG. 8.

A further variant of the control device for the variable transmission according to the invention is shown in FIG. 8. This particular embodiment of the invention includes a control lever 45 which has one end 46 mounted so that it can be pivoted about a fulcrum 68 on the transmission housing 37. At the end of the swivel lever 45 nearest the input shaft 8, there are two rotatably mounted pressure rollers 71 and 72 which exert a control force upon the rigid ring 6 for adjustment of the transmission gear ratio. This control force is applied by a piston and cylinder arrangement 51 having a piston rod 50 which is pivotably connected to the swivel lever 45. FIG. 8a shows an arrangement similar to that of FIG.8 in which the pressure rollers 71 and 72 of FIG. 8 are replaced by slide blocks 71' and 72'.

Figure 9:
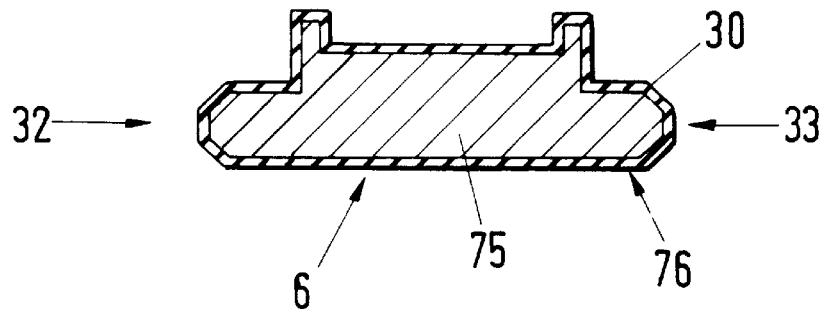
FIG. 9 is a cross sectional view of a torque-transmitting member having a rectangular recess to receive an actuating device.
Figure 10:
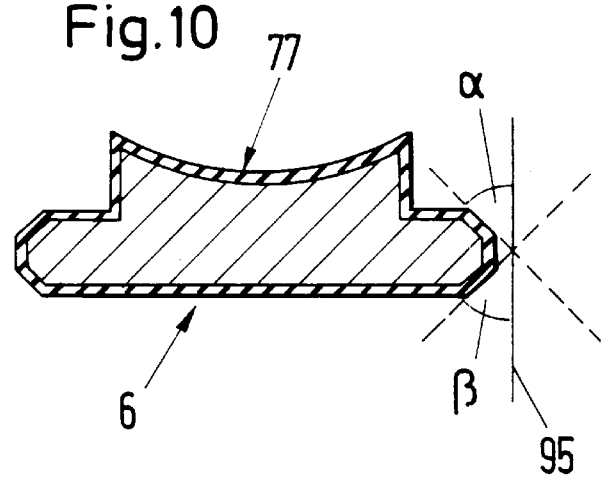
FIG. 10 is a view similar to FIG. 9 showing a torque transmitting member with an elliptical recess.
Figure 11:
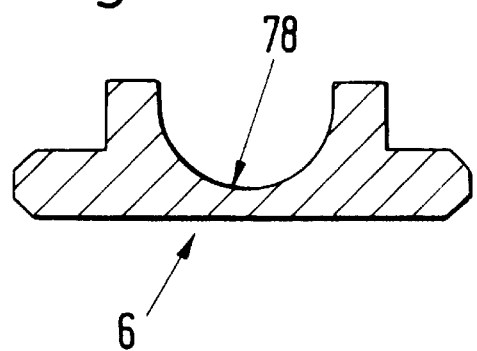
FIG. 11 is a view similar to FIG. 9 showing a torque transmitting member with a semicircular recess.

FIGS. 9–14 show different embodiments of the rigid ring 6 or 86 in cross-sectional representation. Beginning with FIG. 9, a torque transmitting member for the continuously adjustable transmission has a side surface contour with a V-shape, with the tip of the V broken in the region of the axial face sides in which engage the conical surfaces faces 9 and 10 and 11 and 12 of the cone pulleys 2 and 3 and 4 and 5. The arms of the V form angles α and β to the vertical plane 95 (i.e. to a surface perpendicular to the drive shaft). These angles correspond to the conical surface angles of the inner and outer cone pulleys with respect to a perpendicular plane 95 as shown in FIG. 10.

For reception of the pressure elements, e.g. the rollers 71 and 72 or corresponding slide blocks, a recess 73 having a rectangular configuration in this embodiment is provided on the radially outer surface of the rigid ring 6. In the embodiment of FIG. 9 the rigid ring has a metallic core 75 and an outer casing 30 which may be made, for example, from an elastomeric material such as rubber.

Figure 12:
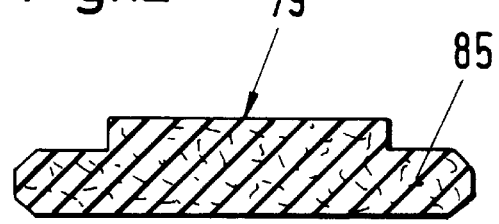
FIG. 12 is a view similar to FIG. 9 showing a torque transmitting member with a flat running surface.

The same general construction is also shown in the rigid ring shown in FIG. 10. In this case, however, a recess 77 having, for instance, an elliptical section is provided. By contrast, the rigid ring shown in according to FIG. 11 has a semicircular recess 78 and is made completely of metal, while the rigid ring shown in FIG. 12 provides a level running surface 79 to receive the pressure element(s) of the adjusting device. Moreover, this rigid ring 6 is made completely of an elastic material 85, which is preferably produced in a fibre-reinforced construction, e.g. with aramid fibers or carbon fibers.

Figure 13:
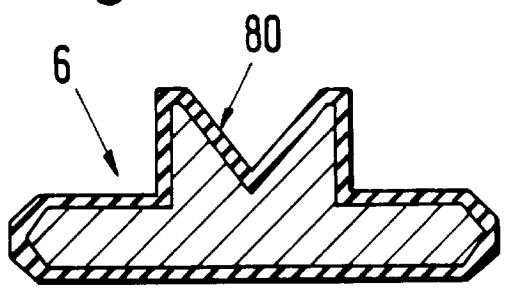
FIG. 13 is a view similar to FIG. 9 showing a torque transmitting member with a V-shaped recess.
Figure 14:
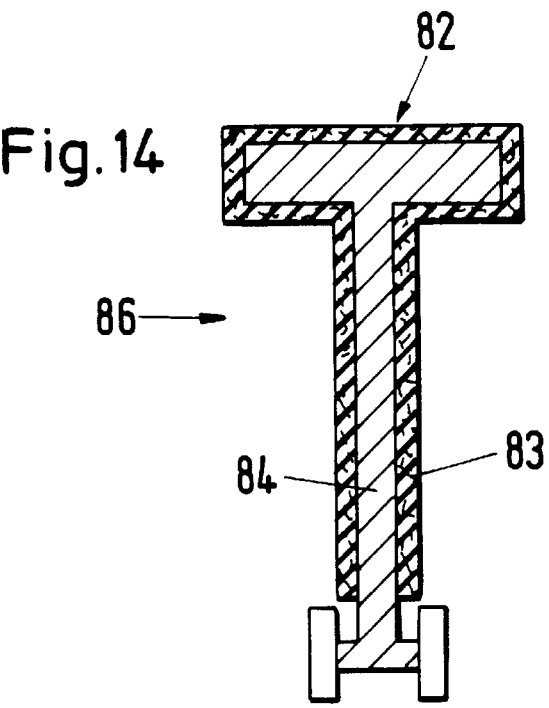
FIG. 14 is a cross sectional view of a ring-shaped torque transmitting member of T-shaped cross section.

FIG. 13, by contrast, shows a rigid ring having the aforementioned rubber-metal construction in which the recess 80 has a roughly V-shaped geometry. The T-shaped ring 86 previously described with respect to FIG. 7 can be seen in FIG. 14. It has a T-shaped cross-sectional surface with an arm 82 of the T which extends towards the pressure supplying element having a level running surface. Moreover, this ring is also made as a composite component, in which a metal core 84 is surrounded by a layer of fibre-reinforced rubbery material 83.

Figure 15:
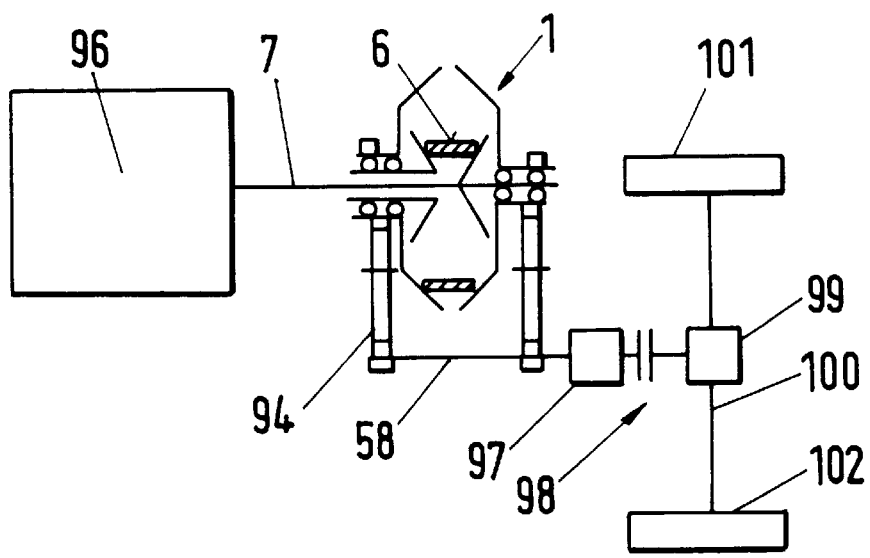
FIG. 15 is a schematic diagram showing a vehicle drive arrangement having a transmission according to the invention.

FIG. 15 depicts a drive arrangement for a motor vehicle, in which a drive motor 96 is connected by a shaft 7 to the inner cone pulley pairs of the transmission 1 according to the invention and the outer pair of cone pulleys drives an output shaft 58 which is connected through a reverse gear 97 and a starting clutch 98 to a differential 99 by engaging teeth and gears 94. From the differential 99, two axle drive shafts 100 are connected in driving relation to two vehicle wheels 101 and 102.

In another variant of the drive arrangement (FIG. 1a), the drive torque is transmitted from the input shaft to the outer pair of cone pulleys in the transmission and is applied to the output shaft by the inner pair of cone pulleys.

Figure 16:
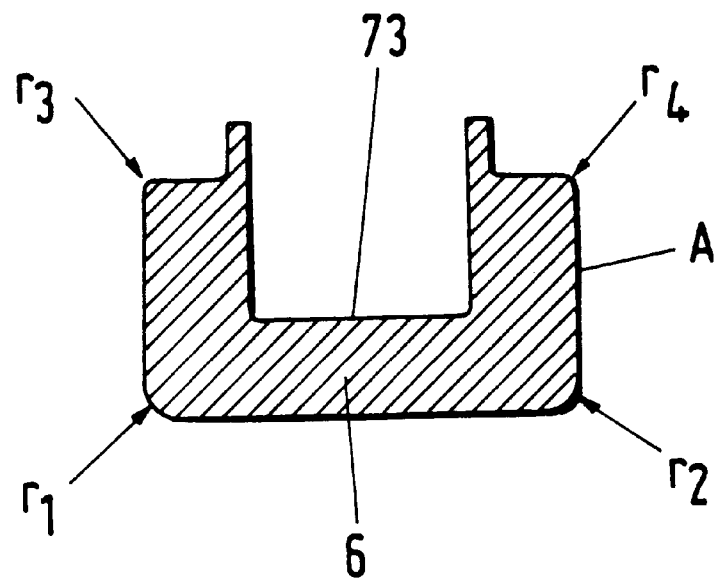
FIG. 16 is a cross sectional view illustrating another form of torque transmitting member.
Figure 17:
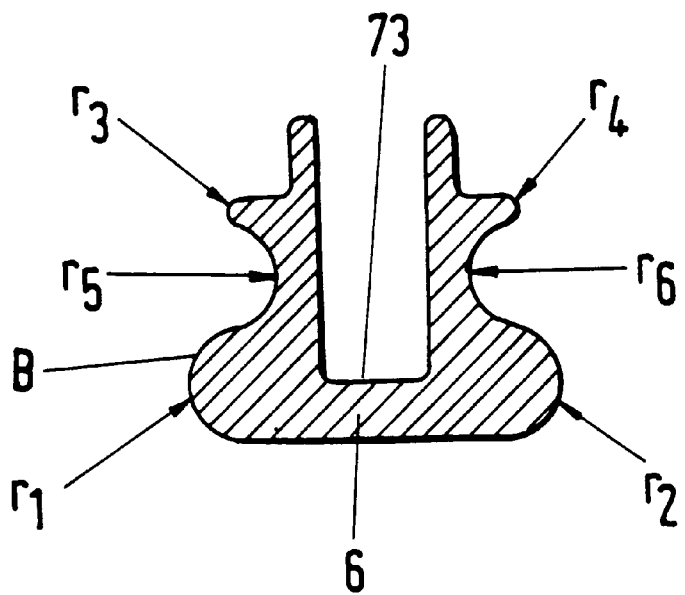
FIG. 17 is a cross sectional view illustrating a further embodiment of a torque transmitting member.

FIGS. 16 and 17 show two further arrangements of a rigid ring torque transmission member 6 in cross-sectional representation. In these embodiments the outer contour A of the cross-section has at least four cone engaging surfaces with radii $r_1$ and $r_2$ and $r_3$ and $r_4$, the first two radii $r_1$ and $r_2$ respectively being larger than the other two radii $r_3$ and $r_4$. In the embodiments shown in FIGS. 16 and 17, the regions of the rigid ring 6 having the outer contour radii $r_1$ and $r_2$ form the friction surfaces which engage the surfaces of the inner cone pulleys 2 and 3 and the regions having the outer contour radii $r_3$ and $r_4$ form the friction surfaces which engage the surfaces of the outer cone pulleys 4 and 5 of the transmission. In FIGS. 16 and 17 also, the cross-sectional geometry of the rigid ring 6 has an essentially U-shaped structure with a recess 73 for reception of the above-described pressure applying elements 34 and 36 being provided on the radially outward side of the rigid ring.

As can also be seen from FIG. 17, the outer contour B of the rigid ring 6 can also include additional radii $r_5$ and $r_6$, which are located between the outer contour radii $r_1$ and $r_3$ and $r_2$ and $r_4$. These additional outer contour radii $r_5$ and $r_6$ are larger than the radii $r_3$ and $r_4$, providing a material-saving and hence weight-saving construction of the torque transmission member 6.

Although the invention has been described herein with reference to specific embodiments, many modifications and variations therein will readily occur to those skilled in the art. Accordingly, all such variations and modifications are included within the intended scope of the invention.

We claim:

1. A continuously adjustable transmission arrangement comprising:
   two pairs of cone pulleys; and
   a torque transmitting member disposed between and engaging the two pairs of cone pulleys;
   one pair of cone pulleys being driven by a transmission input shaft and the second pair of cone pulleys driving a transmission output shaft;
   wherein the two pairs of cone pulleys are supported concentrically with respect to each other on one of the transmission drive shaft and the transmission output shaft and;
   wherein the two pairs of cone pulleys comprise an inner cone pulley pair surrounded by an outer cone pulley pair and wherein a first of the cone pulleys of the outer cone pulley pair is rotatably supported an axially fixed on a large diameter region of a supporting shaft and a second cone pulley of the outer cone pulley pair is mounted in rotatable and axially displaceable relation with respect to a reduced-diameter region of the supporting shaft.

2. A continually adjustable transmission arrangement according to claim 1 wherein the inner cone pulley pair having conical surfaces which open radially outwardly is disposed within the outer cone pulley pair having conical surfaces which open radially inwardly.

3. A continuously adjustable transmission arrangement according to claim 1 wherein the outer cone pulley pair radially encloses an inner cone pulley pair.

4. A continuously adjustable transmission arrangement according to claim 1 wherein a first cone pulley of the inner cone pulley pair is supported for rotation and is axially displaceable on a reduced diameter portion of the supporting shaft and wherein the second cone pulley of the outer cone pulley pair is rotatably supported on an axial extension of the second inner cone pulley.

5. A continuously adjustable transmission arrangement according to claim 1 wherein a first pulley of the inner cone pulley pair is supported on a reduced-diameter section of the supporting shaft and wherein the two pulleys of the outer cone pulley pair are supported by roller bearings and thrust bearings on the supporting shaft and on the first inner cone pulley, respectively.

6. A continuously adjustable transmission arrangement according to claim 5 wherein the thrust bearings are disposed between sides of extensions of the outer cone pulleys and collars on the supporting shaft and on a first inner cone pulley extension, respectively.

7. A continuously adjustable transmission arrangement according to claim 6 including a ring mounted on the extension of the first inner cone pulley and wherein the thrust bearing for an outer cone pulley is supported against the ring so that the outer cone pulley can be moved axially by a force-applying means.

8. A continuously adjustable transmission arrangement according to claim 1 including a force-applying means between an end face of a cone pulley and a collar on a reduced diameter region of the supporting shaft to apply a contact pressure against the torque transmitting member.

9. A continuously adjustable transmission arrangement according to claim 8 wherein the force applying means is a spring.

10. A continuously adjustable transmission arrangement according to claim 1 including extensions on the outer cone pulleys formed with peripheral teeth.

11. A continuously adjustable transmission arrangement according to claim 1 wherein the torque transmitting member comprises a rigid ring.

12. A continuously adjustable transmission arrangement according to claim 11 including a fiber-reinforced friction material on at least one of the cone pulleys and the rigid ring.

13. A continuously adjustable transmission arrangement according to claim 11 wherein the rigid ring is formed with a recess on its radially outer periphery to receive a ratio adjusting member for exerting a control force upon the rigid ring.

14. A continuously adjustable transmission arrangement according to claim 11 wherein the side faces of the rigid ring have an approximately V-shaped cross-sectional geometry with the tip of the V removed.

15. A continuously adjustable transmission arrangement according to claim 14 wherein surfaces of the V shape have angles with respect to a plane perpendicular to the supporting shaft which correspond to the angles of the cone pulley surfaces which are engaged by the surfaces of the rigid ring.

16. A continuously adjustable transmission arrangement according to claim 11 including a pressure control member affixed to a transmission housing and at least one pressure applying element engaging the rigid ring for transmitting pressure thereto from the pressure control member so as to move the rigid ring radially with respect to the longitudinal axis of the shaft.

17. A continuously adjustable transmission arrangement according to claim 16 wherein the pressure applying elements are slide blocks.

18. A continuously adjustable transmission arrangement according to claim 16 including a vehicle having a drive train in which the transmission is included.

19. A continuously adjustable transmission arrangement according to claim 18 including circumferential teeth on extensions of the two outer cone pulleys and chains which mesh with the circumferential teeth and with teeth of drive gears on a transmission shaft.

20. A continuously adjustable transmission arrangement according to claim 19 including circumferential teeth on an extension of at least of one of the outer cone pulleys and at least one gearwheel engaging the circumferential teeth and the teeth of a drive gear on a transmission shaft.

21. A continuously adjustable transmission arrangement according to claim 1 wherein the outer cone pulleys are coupled to the transmission input shaft and the inner cone pulleys are coupled to the transmission output shaft.

22. A continuously adjustable transmission arrangement comprising:

two pairs of cone pulleys; and a torque transmitting member disposed between and engaging the two pairs of cone pulleys;

one pair of cone pulleys being driven by a transmission input shaft and the second pair of cone pulleys driving a transmission output shaft;

wherein the two pairs of cone pulleys are supported concentrically with respect to each other on one of the transmission drive shaft and the transmission output shaft;

including a force-applying means between an end face of a cone pulley and a collar on a reduced diameter region of the supporting shaft to apply a contact pressure against the torque transmitting member; and wherein the force-applying means is a pressure operated piston and cylinder arrangement, which produces a contact pressure in accordance with a desired gear ratio or an input torque to the transmission.

23. A continuously adjustable transmission arrangement comprising:

two pairs of cone pulleys; and a torque transmitting member disposed between and engaging the two pairs of cone pulleys;

one pair of cone pulleys being driven by a transmission input shaft and the second pair of cone pulleys driving a transmission output shaft;

wherein the two pairs of cone pulleys are supported concentrically with respect to each other on one of the transmission drive shaft and the transmission output shaft;

wherein the torque transmitting member comprises a rigid ring;

including a pressure control member affixed to a transmission housing and at least one pressure applying element engaging the rigid ring for transmitting pressure thereto from the pressure control member so as to move the rigid ring radially with respect to the longitudinal axis of the shaft; and wherein the pressure control member is a piston and cylinder arrangement and an actuating rod which supports at least one rotatably mounted pressure roller at one end and is connected to the piston and cylinder arrangement at another end.

24. A continuously adjustable transmission arrangement comprising:

two pairs of cone pulleys; and a torque transmitting member disposed between and engaging the two pairs of cone pulleys;

one pair of cone pulleys being driven by a transmission input shaft and the second pair of cone pulleys driving a transmission output shaft;

wherein the two pairs of cone pulleys are supported concentrically with respect to each other on one of the transmission drive shaft and the transmission output shaft;

wherein the torque transmitting member comprises a rigid ring;

including a pressure control member affixed to a transmission housing and at least one pressure applying element engaging the rigid ring for transmitting pressure thereto from the pressure control member so as to move the rigid ring radially with respect to the longitudinal axis of the shaft; and wherein the pressure control member is a support member having an arc-shaped section supporting at least one rotatably mounted pressure roller and including an actuating device at one end of the support member and wherein another end of the support member is pivotally supported on the transmission housing.

25. A continuously adjustable transmission arrangement comprising:

two pairs of cone pulleys; and a torque transmitting member disposed between and engaging the two pairs of cone pulleys;

one pair of cone pulleys being driven by a transmission input shaft and the second pair of cone pulleys driving a transmission output shaft;

wherein the two pairs of cone pulleys are supported concentrically with respect to each other on one of the transmission drive shaft and the transmission output shaft;

wherein the torque transmitting member comprises a rigid ring;

including a pressure control member affixed to a transmission housing and at least one pressure applying element engaging the rigid ring for transmitting pressure thereto from the pressure control member so as to move the rigid ring radially with respect to the longitudinal axis of the shaft; and wherein the pressure control member is a control lever which is pivotally supported at one end on the transmission housing and which has a side facing the cone pulleys which supports at least one pressure element and has a side facing away from the cone pulleys which is movable by an actuating device.

26. A continuously adjustable transmission arrangement comprising;

two pairs of cone pulleys; and a torque transmitting member disposed between and engaging the two pairs of cone pulleys;

one pair of cone pulleys being driven by a transmission input shaft and the second pair of cone pulleys driving a transmission output shaft;

wherein the two pairs of cone pulleys are supported concentrically with respect to each other on one of the transmission drive shaft and the transmission output shaft; and wherein the torque transmission member is a rigid ring having a cross-sectional geometry with an outer contour which includes least four radii, two of the radii adjacent to the outer periphery of the ring being larger than two of radii located inwardly from the outer periphery of the of the ring.

27. A continuously adjustable transmission arrangement according to claim 26 wherein the regions of the rigid ring having the larger radii form friction surfaces which engage the inner cone pulleys and the regions of the rigid ring having the smaller radii form friction surfaces which engage the outer cone pulleys.

28. A continuously adjustable transmission arrangement according to claim 26 wherein the outer periphery of the rigid ring is essentially U-shaped.

29. A continuously adjustable transmission arrangement according to claim 26 wherein the outer contour of the rigid ring includes two further radii located between the two larger radii and the two smaller radii.

30. A continuously adjustable transmission arrangement according to claim 29 wherein two further radii are larger than the radii located inwardly from the outer periphery of the ring.

* * * * *